United States Patent [19]

Schwan

[11] 3,920,666

[45] Nov. 18, 1975

[54] 6,6A,7,11B-TETRAHYDRO-5H-INDENO(2,1-C)ISOQUINOLINE HYDROCHLORIDE

[75] Inventor: Thomas J. Schwan, Norwich, N.Y.

[73] Assignee: Morton-Norwich Products, Inc., Norwich, N.Y.

[22] Filed: Sept. 16, 1974

[21] Appl. No.: 506,295

[52] U.S. Cl.......... 260/286 R; 260/283 R; 260/568; 424/258
[51] Int. Cl.²...................................... C07D 217/06
[58] Field of Search ................... 260/286 R, 283 R

[56] References Cited
UNITED STATES PATENTS
3,830,647   8/1974   Janssens.......................... 260/283 R

OTHER PUBLICATIONS

Govindachari et. al., "Chem. Ber.", 91, 2053–2060, (1958).

Primary Examiner—Donald G. Daus
Assistant Examiner—David E. Wheeler
Attorney, Agent, or Firm—Anthony J. Franze

[57] ABSTRACT

The title compound is a useful anthelmintic agent.

1 Claim, No Drawings

6,6A,7,11B-TETRAHYDRO-5H-INDENO(2,1-C)ISOQUINOLINE HYDROCHLORIDE

This invention is concerned with the chemical compound 6,6a,7,11b-tetrahydro-5H-indeno[2,1-c]isoquinoline hydrochloride. It is useful as an anthelmintic agent. When administered per os by gavage in a suspension at a dose of about 100 mg/kg to mice harboring the pinworm *Syphacia obvelata*, a 90 percent reduction of pinworm population is secured.

The method currently preferred for the preparation of the compound of this invention is briefly described as follows:

A. 2-Benzylamino-1-indanol Hydrochloride Tetartohydrate

A mixture containing 55.8 g (0.262 mole) of 2-bromo-1-indanol and 56.0 g (0.524 mole) of benzylamine in 250 ml dioxane was stirred and refluxed for 4 days, cooled and stirred at ambient temperature for 1 hour, and filtered. The solid was washed with 4×25 ml dioxane.

The filtrate and combined washings were concentrated to dryness in vacuo and the residue was dissolved in 120 ml absolute ethanol. Treatment with ethanolic hydrogen chloride gave in three crops 34.2 g (47 percent) of the product, m.p. 154°–180°.

Purification was effected by recrystallization from absolute and subsequent vacuum sublimation at 220–230 (0.2 mm), m.p. 206°–208°.

Anal. Calcd. for $C_{16}H_{17}NO.HCl.¼H_2O$: C, 68.56; H, 6.62; N, 5.00; $H_2O$, 1.61. Found: C, 68.88; H, 6.62; N, 5.01 $H_2O$, 1.48.

B. 6,6a,7,11b-Tetrahydro-5H-indeno 2,1-c]isoquinoline Hydrochloride

To 311 g polyphosphoric acid was added 20 g (0.073 mole) of A. The mixture was stirred and heated at 95°–100° on a steam bath for 18 hours and poured into 2,000 g iced water. The mixture was cooled, 392 g KOH was added over 45 min to pH>10, and the alkaline material was extracted with 500 ml and 250 ml portions of $CHCl_3$. The combined extract solutions were washed with 300 ml $H_2O$, dried ($MgSO_4$), and concentrated to dryness in vacuo to give 12.0 g of an oil. The oil was dissolved in 35 ml absolute ethanol and 20 ml ethanolic hydrogen chloride was added. Upon cooling there was obtained 10.0 g (55 percent) of the product, m.p. 247°–260°. Further recrystallization from absolute ethanol gave an analytical sample, m.p. 279°–284°.

Anal. Calcd. for $C_{16}H_{15}N.HCl$: C, 74.55; H, 6.26, N, 5.44. Found: C, 74.58; H, 6.45; N, 5.40.

What is claimed is:
1. 6,6a,7,11b-tetrahydro-5H-indeno 2,1-c]isoquinoline hydrochloride.

* * * * *